United States Patent Office 2,813,890
Patented Nov. 19, 1957

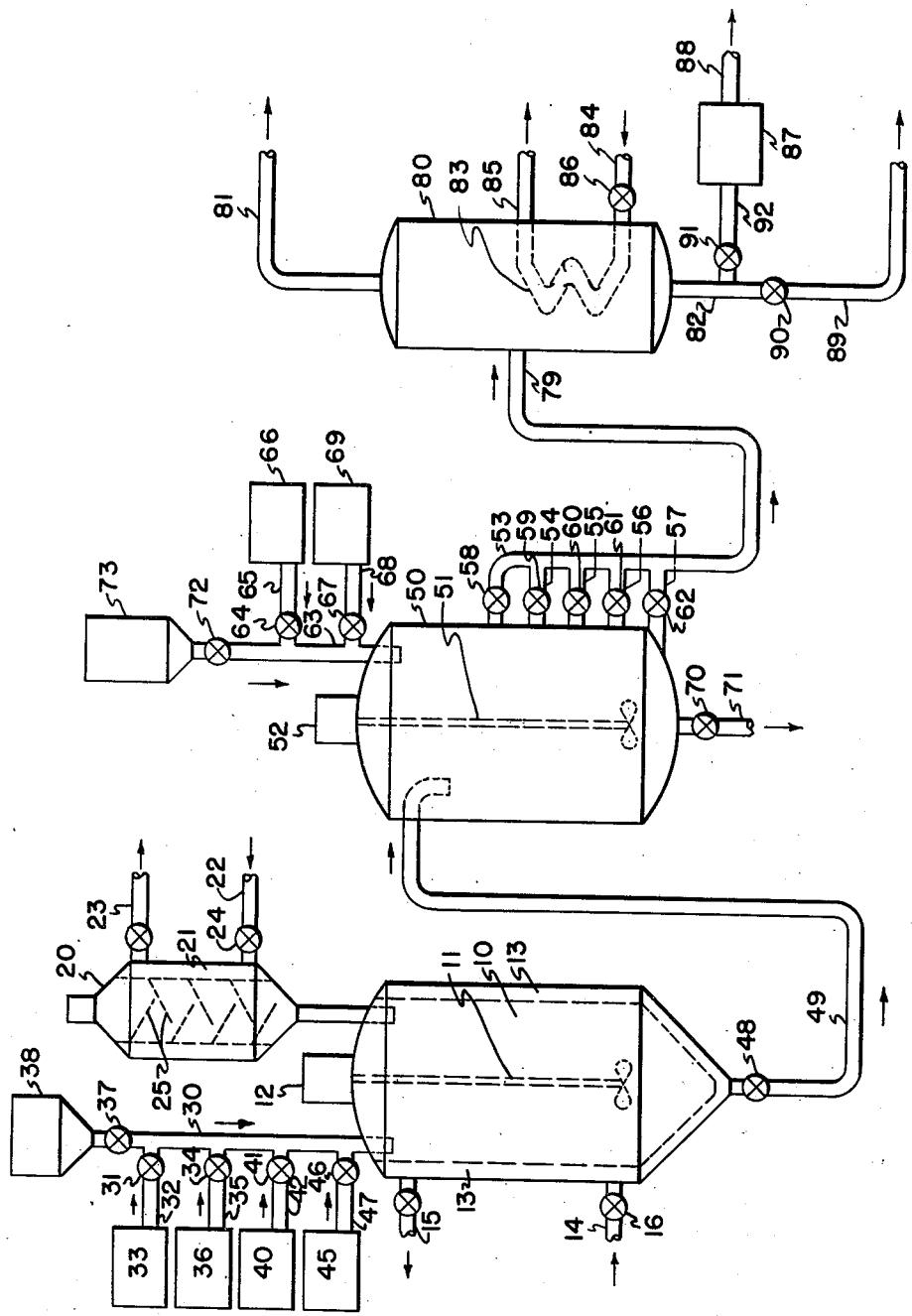

2,813,890
MANUFACTURE OF ALKYL XANTHOGEN SULFIDES

Elmer B. Cyphers, Cranford, and George M. McNulty, Union, N. J., assignors to Esso Research and Engineering Company, a corporation of Delaware Application October 15, 1954, Serial No. 462,541

10 Claims. (Cl. 260—455)

This invention relates to an improved method for preparing dialkyl xanthogen sulfides.

The utilization of dialkyl xanthogen sulfides as additives in lubricating compositions is well known. These additives are especially useful in cutting oils and active-sulfur-type extreme pressure lubricants. In cutting oils, for example, the addition of about 0.1 to 5% by weight of a dialkyl xanthogen sulfide promotes a faster and smoother cutting operation and also substantially increases tool life.

The dialkyl xanthogen sulfides of this invention have the following general formula:

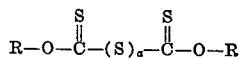

where R is an alkyl group containing 2 to 8 carbon atoms and $a$ is an integer of 3 to 4. When $a$ is 4, the compound is an alkyl xanthogen tetrasulfide which is especially useful in lubricating compositions which require highly reactive sulfur, whereas when $a$ is 3, the compound is an alkyl xanthogen trisulfide which is useful in lubricating compositions where highly reactive sulfur is not required. These compounds may be prepared by the reactions set forth below. Initially in the preparation of either the tetrasulfide or trisulfide, the following reaction is carried out:

$$ROH + CS_2 + MOH \longrightarrow \underset{\text{Xanthate}}{R-O-\overset{\overset{\displaystyle S}{\|}}{C}-S-M} + H_2O \quad (1)$$

where R is an alkyl radical containing 2 to 8 carbon atoms and M is an alkali metal. Then to produce the tetrasulfide, the following reaction is carried out:

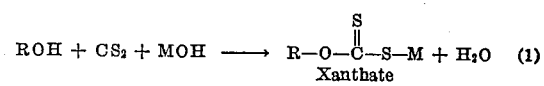

where X is a halogen atom. On the other hand to produce the trisulfide, the following reaction is carried out with the xanthate:

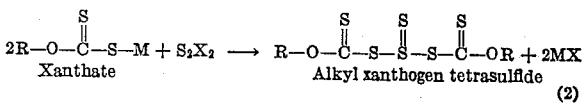

In the prior art method of manufacturing these alkyl xanthogen sulfides, the first reaction described above was carried out using an amount of alcohol substantially in excess of the stoichiometric proportion. Thereafter the resultant reaction mixture which contained a substantial amount of unreacted alcohol was filtered to recover the portion of the xanthate which was insoluble therein and the filtrate was then distilled to remove alcohol and water to thus recover the remainder of the xanthate as a salt. The total xanthate product was then dried to remove the last traces of alcohol and water therefrom. In certain cases the xanthate was recovered from the reaction mixture and dried in a one step procedure by means of a drum drier. In either case the dried xanthate was then dispersed in naphtha and reacted with sulfur monohalide or sulfur dihalide, depending on whether the tetrasulfide or trisulfide was to be formed, followed by refluxing, filtration to remove the metal salts (MX) and distillation to separate the sulfide product from the naphtha. In this prior art method, it was necessary to separate the solid xanthate from the excess alcohol and the water of reaction after the first step because if this was not done the excess alcohol and the water would react in the second step with the sulfur halides to produce elemental sulfur and hydrogen halides and as a result practically no alkyl xanthogen sulfide product would be formed. Because of the numerous processing steps required for producing the alkyl xanthogen sulfides by this prior art method, the cost of production was practically prohibitive.

It has now been found that alkyl xanthogen sulfides may be produced in good yield by a considerably less complicated and less expensive method in accordance with this invention. In accordance with the present invention stoichiometric proportions of the alcohol and the metal hydroxide are employed in the initial reaction so that no excess alcohol nor excess metal hydroxide are present. It has been found that when using these proportions, the water produced in the initial reaction surprisingly does not react with the sulfur halide to cause the undesirable results which were encountered in the prior art when the water and alcohol were not removed prior to the addition of the sulfur halide. Thus in the method of the present invention it is unnecessary to separate the xanthate from the reaction mixture prior to the reaction with the sulfur halide. More particularly, the present invention comprises forming in an inert organic solvent a mixture of about 1 mole of an alcohol having the formula $$ROH$$

where R is an alkyl group containing 2 to 8 carbon atoms and about 1 mole of a hydroxide having the formula $$MOH$$

where M is an alkali metal, adding to this mixture in the range of about 1 to 2 moles of carbon disulfide to form the xanthate in the resultant reaction mixture, adding to this reaction mixture in the range of about 0.5 to 1 mole of a compound having the formula $$S_yX_2$$

where $y$ is an integer of 1 to 2 and X is a halogen atom such as chlorine, bromine or iodine to form the dialkyl xanthogen sulfide and subsequently separating the dialkyl xanthogen sulfide from the reaction mixture. The separation may be accomplished by decanting or filtering the solvent which contains the alkyl xanthogen sulfide from the solvent-insoluble metal halide, followed by distillation of the inert solvent and the water of reaction from the alkyl xanthogen sulfides. Preferably the proportions of all of the reactants are selected to be approximately stoichiometric so as to avoid undesired side reactions.

The method of the present invention may be more readily understood by reference to the single figure drawing which shows apparatus suitable for carrying out the method of this invention. Reference character 10 designates a reactor which is equipped with mechanical stirrer 11 which is operated by motor 12. If desired, reactor 10 may be equipped with a cooling jacket 13 through which a coolant may be passed to remove the heat resulting from the chemical reactions. Thus cooling water or brine, for example, may be introduced into jacket 13 through conduit 14 and removed therefrom through conduit 15. The rate of cooling may be controlled by valve 16 in conduit 14 by means of which the rate of introduction of the coolant is regulated. Reactor 10 is also provided with a refluxing column 20 which is equipped with a cooling jacket 21 into which a coolant may be introduced through conduit 22 and removed therefrom through conduit 23. The rate of introduction of the coolant which may be cooling water or brine, for example, is regulated by means of valve 24 in conduit 22. Refluxing column 20 may be equipped with a plurality of baffles 25 to facilitate the refluxing operation. Thus refluxing column 20 is also a means of removing the heat of reaction which occurs in reactor 10.

Initially in the method of this invention an inert organic solvent is introduced into the interior of reactor 10 through inlet conduit 30 by opening valve 31 in conduit 32 to permit inert solvent to flow from storage tank 33. The particular inert organic solvent employed should be one in which the alkyl xanthogen sulfides are soluble and in which alkali metal halides are insoluble as well as one which preferably has a lower boiling point than the alkyl xanthogen sulfides. Preferably the solvent is a hydrocarbon such as naphtha, benzol, hexane, toluene, petroleum fractions such as those of lubricating viscosity, heptane and the like, benzol being preferred.

The solvent is preferably employed in an amount at least equivalent to the weight of the reactants involved in the subsequent reactions, or expressed in another way, the volume of solvent employed is preferably at least about four times the volume of alcohol which is subsequently added.

After the solvent has been introduced to reactor 10, an alcohol is added to reactor 10 through inlet conduit 30 by opening valve 34 in conduit 35 to permit the alcohol to flow from storage tank 36. The alcohol employed in this invention has the formula

ROH where R is an alkyl radical containing 2 to 8 carbon atoms. The particular alcohol selected will, of course, depend upon the particular alkyl xanthogen sulfide which it is desired to produce. The preferred alcohols are ethyl alcohol and isopropyl alcohol, although it will be understood that other alcohols such as n-butyl, isobutyl, amyl, etc., may likewise be employed in this invention.

Then an essentially anhydrous alkali hydroxide is added to the mixture in reactor 10 by opening valve 37 in inlet conduit 30 to permit the alkali hydroxide contained in hopper 38 to fall into reactor 10. Although any of the alkali metal hydroxides may be employed in this reaction, sodium hydroxide is especially preferred on account of its ready availability and low cost. About 1 mole of the alkali metal hydroxide is added to the mixture in reactor 10 for each mole of alcohol. The resultant mixture in reactor 10 is then thoroughly mixed by means of stirrer 11 over a period of time which may be as much as about 5 hours or more.

Thereafter, carbon disulfide is introduced into the aforementioned mixture in reactor 10 from storage tank 40 by opening valve 41 in conduit 42 to permit the carbon disulfide to flow from reactor 10 through inlet conduit 30. The carbon disulfide is added to the mixture slowly with stirring, preferably over a period of about 0.1 to 2 hours. The amount of carbon disulfide added is in the range of about 1 to 2 moles for each mole of alcohol present in reactor 10, and preferably the ratio is maintained in the range of about 1 to 1.2 moles of carbon disulfide/mole of alcohol. It will thus be seen that in the method of this invention the alcohol is not used in excess of the stoichiometric proportion. The heat of reaction may be removed by means of cooling jacket 13 and/or refluxing column 20. It is preferred to carry out this initial portion of the reaction at a temperature in the range of about 20° to 50° C. and the rate of cooling is accordingly adjusted to produce a temperature in this range. Stirring of the mixture may be continued after all of the carbon disulfide has been added for an additional period of time up to 20 hours to insure substantial completion of the reaction.

Upon completion of this initial reaction as described above, a sulfur halide is then added to the reaction mixture in reactor 10 from storage tank 45 by opening valve 46 in conduit 47 to permit the sulfur halide to pass into inlet conduit 30 and thereafter into reactor 10. In the event it is desired to form an alkyl xanthogen tetrasulfide, sulfur monohalide is employed in the reaction, whereas if it is desired to form alkyl xanthogen trisulfide, a sulfur dihalide is added to the reaction mixture. If desired, mixtures of sulfur monohalide and sulfur dihalide may also be employed. The preferred halide is chlorine although it will be understood that the other halogen elements may be employed if desired. The sulfur halide is added to the reaction mixture in an amount equivalent to about 0.5 to 1 mole thereof per mole of alcohol originally employed in the initial reaction and preferably is added in the range of about 0.5 to 0.6 moles of sulfur halide/mole of alcohol. Preferably, the sulfur halide is added over a period of time in the range of about 0.5 to 2 hours, with continuous stirring of the reaction mixture. During this step, the temperature of reaction is preferably maintained in the range of about 40° to 70° C. which may be accomplished by utilizing cooling jacket 13 and/or refluxing column 20. After the sulfur halide has been added to the reaction mixture, stirring may be continued for an additional period of time up to 20 hours to insure substantial completion of this reaction.

Upon completion of the aforedescribed reactions, the resultant reaction mixture is withdrawn from the bottom of reactor 10 by opening valve 48 in conduit 49 and it is then introduced into vessel 50 which is equipped with a mechanical stirrer 51 operated by motor 52. The reaction mixture in vessel 50 is then allowed to stand without agitation until the metal halide produced in the reactions carried out in reactor 10 settles to the bottom of vessel 50. Thereafter the liquid organic solution is removed from vessel 50 through conduit 79 by decantation through a plurality of taps designated by reference characters 53, 54, 55, 56, and 57 by successively opening valves 58, 59, 60, 61, and 62, respectively. These valves are successively opened from top to bottom to draw off the organic solution until the upper level of the solid metal halide on the bottom of vessel 50 is reached. The organic solution withdrawn from vessel 50 is then passed through conduit 79 to still 80 for subsequent recovery operations, which will be described hereinafter in greater detail.

After the liquid organic solution has been removed from vessel 50, valves 58–62 are closed and an inert organic solvent similar to that utilized in reactor 10 may be introduced into vessel 50 through conduit 63 by opening valve 64 in conduit 65 to withdraw solvent from storage tank 66. Mechanical stirrer 51 is then employed to thoroughly mix this solvent with the metal halide in the bottom of reactor 50 to thereby extract any entrained alkyl xanthogen sulfides from the solid metal halide crystals. The operation of mechanical stirrer 51 is then discontinued; the slurry is allowed to settle and the inert solvent is decanted from vessel 50 and passed through conduit 79 to still 80 in a manner similar to that described in the case of the aforementioned organic solution. This solvent washing step may be repeated if desired in a similar manner. Upon completion of the washing operation, valves 58–62 are again closed and water is introduced into vessel 50 through conduit 63 by opening valve 67 in conduit 68 to permit water to flow from source 69 into vessel 50. Then valve 70 in conduit 71 is opened to permit the resultant water solution containing dissolved metal halides to be removed from vessel 50. It will be seen that vessel 50 is now available for the processing of another batch of reaction mixture from vessel 10.

As has been previously stated, the initial reaction in reactor 10 produces a certain amount of water of reaction. If desired, this water of reaction may be removed from the reaction mixture in vessel 50 by the addition thereto of a solid drying agent such as calcium chloride, calcium sulfate, etc. To carry out this drying operation in vessel 50, the solid drying agent is introduced into the reaction mixture in vessel 50 by opening valve 72 in conduit 63 to permit the solid drying material contained in hopper 73 to fall into vessel 50. Mechanical stirrer 51 is then employed to thoroughly agitate the contents of vessel 50, after which the contents of vessel 50 are allowed to stand without agitation to settle out the solid solvent-insoluble metal halide and drying agent. Thereafter, the organic solution is decanted from vessel 50 and the remaining solids are washed with additional solvent if desired as has previously been described. Water may be then added to vessel 50 from source 69, after which the water containing the solid drying agent and the metal halide is removed from vessel 50 through conduit 71 by opening valve 70. The utilization of calcium chloride as a drying agent is preferred.

As previously mentioned, the organic solution from vessel 50 and the solvent employed in the washing operation in vessel 50 are passed to still 80, which in this process may be any conventional distillation unit which is adapted to take overhead through conduit 81 the inert organic solvent, any unreacted alcohol, carbon disulfide, or sulfur halide and any water of reaction not removed in vessel 50 and which is adapted to remove as a bottoms fraction the alkyl xanthogen sulfide of this invention through conduits 82 and 89. The organic solution and the solvent washings may be separately distilled or they may be distilled together by employing an intermediate storage tank (not shown) between vessel 50 and still 80. Still 80 may be equipped with heating coil 83 to provide the heat necessary to accomplish this distillation separation. In this case a heating medium is introduced to coil 83 through conduit 84 and removed therefrom through conduit 85. The rate of heating may be adjusted by means of valve 86 in conduit 84 which regulates the rate of introduction of the heating medium which may be a high temperature flue gas, steam, etc. Preferably the distillation is carried out under vacuum in the range of about 10 to 150 mm. Hg. The inert solvent may be separated from the other materials in the overhead stream and reused in the process in reactor 10, if desired.

The liquid alkyl xanthogen sulfide removed from still 80 through conduit 82 may then be withdrawn from the system through conduit 89 by opening valve 90 or if desired may be passed alternatively through filter 87 by opening valve 91 in conduit 92 to remove therefrom any small amount of solid materials such as elemental sulfur, entrained metal halides, etc. Filter 87 may be any conventional filter adapted to carry out this processing step such as a plate and frame press, a multiple leaf filter, a continuous rotary filter or the like. The final purified alkyl xanthogen sulfide product in this case is removed from filter 87 through conduit 88.

It will be seen from the above description that the method of this invention is a relatively simple and inexpensive operation involving simply the steps of forming the alkyl xanthogen sulfide in a reaction zone and subsequently separating the solid metal halide and the inert organic solvent from the alkyl xanthogen sulfide product. In the method of this invention, it is thus unnecessary to recover the xanthate product formed in the first reaction prior to carrying out the second reaction. Because of the tendency of the sulfur-containing compounds involved in this invention to react with metal surfaces, it is preferable to carry out the method of this invention in glass-lined equipment. It will be understood that modifications of this invention may be made by those skilled in the art without departing from the spirit of the invention. For example, filtration may be substituted for the decantation step carried out in vessel 50. Other modifications will be apparent to those skilled in the art.

The following examples are given to more clearly set forth the method of this invention, but it will be understood that it is not intended that the invention be limited solely thereto.

*Example 1*

A mixture was formed in a glass beaker which consisted of 32 grams of NaOH (0.8 mole), 60 cc. of isopropyl alcohol (0.8 mole), and 500 cc. of a petroleum naphtha having a boiling range of about 165 to 235° F. This mixture was thoroughly stirred. Thereafter, 67 grams of carbon disulfide (0.88 mole) were added to the above mixture with stirring and with cooling which was accomplished by means of an ice bath arranged around the beaker. The reaction temperature was maintained in the range of about 50 to 70° F. and stirring was continued for an hour during which time the temperature of the reaction mixture rose to about 80° F. About sixteen hours later, 67.5 grams of sulfur monochloride (0.5 mole) were added slowly to the reaction mixture in the temperature range of about 50 to 60° F. with stirring and cooling which was accomplished by an ice bath. The ice bath was then removed and the contents of the beaker were stirred for an additional 2 hours with the temperature rising to about 85° F. Thereafter, the reaction mixture was allowed to settle and the liquid organic solution was decanted from the insoluble sodium chloride in the bottom of the beaker. The decanted organic solution was distilled under vacuum to separate the resultant alkyl xanthogen tetrasulfide from the naphtha solvent after which the liquid alkyl xanthogen tetrasulfide was filtered. A yield of 55 grams was obtained, which represented 41% of the theoretical yield. This product contained 70.52% sulfur.

*Example 2*

To a glass flask equipped with a stirrer were added 96 grams of NaOH, 180 cc. of isopropyl alcohol, and 750 cc. of the naphtha solvent employed in Example 1. Thereafter, 201 grams of carbon disulfide were added to the above mixture over a period of about ten minutes without any cooling of the reaction mixture. Stirring of the reaction mixture was continued for about an hour after the carbon disulfide had been added. The temperature of the reaction mixture during this period was in the range of about 24° to 43° C. Then 202.5 grams of sulfur monochloride were added to the reaction mixture over a period of about 40 minutes. The temperature of the reaction mixture was maintained during this period in the range of about 40° to 70° C. by refluxing. The resultant reaction mixture was then stirred for an additional 2 hours. Stirring was then discontinued and the contents of the glass flask were allowed to settle. Then about 100 grams of calcium chloride were added to the reaction mixture and the contents of the flask were thoroughly stirred. The liquid organic layer was then decanted from the flask, and the flask was washed twice with additional naphtha, the naphtha washings being added to the initially decanted liquid product. The naphtha solution was then subjected to distillation to separate the naphtha from the alkyl xanthogen tetrasulfide product and 240 grams of the sulfide product were obtained, which represented 60% of the theoretical yield. This product contained 62% by weight of sulfur. Thereafter, water was added to the solid contents of the reaction flask, after which additional naphtha was added to the reaction flask in order to extract alkyl xanthogen tetrasulfide from the water solution. The naphtha extract was then distilled as described above and an additional 12 grams of propyl xanthogen tetrasulfide were recovered which contained 61.32% sulfur. Thus the overall yield was 63% of the theoretical yield.

Example 3

About 64 grams of NaOH, 122 cc. of absolute ethyl alcohol, and 500 cc. of the naphtha solvent employed in Example 1 were added to a glass flask and were stirred together for 5 hours. Then 135 grams of carbon disulfide were added to the above mixture with stirring over a period of about 15 minutes and the resultant reaction mixture was stirred for an additional 16 hours. Then 135 grams of sulfur monochloride were added with refluxing and stirring over a period of about 45 minutes and the contents of the flask were then stirred for an additional 6 hours. The liquid organic solution was then decanted from the insoluble salts in the bottom of the flask and the salts were washed twice with naphtha, the naphtha washings being added to the initially decanted organic solution, whereafter the mixture was distilled under vacuum to separate the naphtha solvent from the ethyl xanthogen tetrasulfide. A yield of 140 grams of ethyl xanthogen tetrasulfide which represented 53% of the theoretical yield, was obtained, which product contained 57.58% sulfur.

Example 4

A blend was prepared which consisted of 64 grams of NaOH, 120 cc. of isopropyl alcohol, and 500 cc. of benzol. This mixture was stirred together for about 5 hours. Then 135 grams of carbon disulfide were added with stirring to the contents of the flask over a period of about 15 minutes and the stirring was continued for an additional 16 hours, after which 135 grams of sulfur monochloride were added to the flask over a period of about 45 minutes. Stirring was continued for an additional 6 hours after the addition of the sulfur monochloride. Thereafter the benzol solution was decanted from the salts in the bottom of the flask which were washed twice with additional benzol. The isopropyl xanthogen tetrasulfide was then separated from the benzol solvent by distillation, and a yield of 210 grams was obtained, which represented 79% of the theoretical yield. The product contained 65.82% sulfur.

Example 5

To a glass flask were added 64 grams of NaOH, 120 cc. of isopropyl alcohol, 500 cc. of benzol, and 50 grams of calcium chloride. This mixture was stirred together for about 5 hours, after which 122.5 grams of carbon disulfide were added over a period of about 15 minutes. The resultant reaction mixture was stirred for an additional 16 hours, after which 108 grams of sulfur monochloride were added to the flask over a period of about 45 minutes, and thereafter stirring was continued for an additional 6 hours. The benzol solution was then decanted from the flask and the salts were washed twice with additional benzol, the washings being added to the initially decanted benzol solution. The total solution was then subjected to vacuum distillation to recover 165 grams of isopropyl xanthogen tetrasulfide, which represented 62% of the theoretical yield. The product contained 57.93% sulfur by weight.

What is claimed is:

1. An improved method for preparing an alkyl xanthogen sulfide which comprises forming in an inert organic solvent a mixture of about 1 mole of an alcohol having the formula $$ROH$$

where R is an alkyl group containing 2 to 8 carbon atoms and about 1 mole of an anhydrous metal hydroxide having the formula $$MOH$$

where M is an alkali metal, adding to said mixture in the range of about 1 to 2 moles of carbon disulfide while maintaining the temperature of the mixture at about 20–50° C. to form in the resultant reaction mixture a compound having the formula

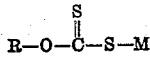

adding to said reaction mixture in the range of about 0.5 to 1 mole of a sulphur halide having the formula $$S_yX_2$$

where y is an integer of 1 to 2 and X is a halogen atom while maintaining the temperature of the reaction mixture at about 40–70° C. to form in the resultant second reaction mixture an alkyl xanthogen sulfide, and separating said alkyl xanthogen sulfide from said second reaction mixture.

2. Method according to claim 1 wherein said alcohol is isopropyl alcohol.
3. Method according to claim 1 wherein said alcohol is ethyl alcohol.
4. Method according to claim 1 wherein said solvent is benzol.
5. Method according to claim 1 wherein said sulfur halide is sulfur monochloride.
6. Method according to claim 1 wherein said sulfur halide is sulfur dichloride.
7. Method according to claim 1 wherein said hydroxide is NaOH.

8. An improved method for preparing an alkyl xanthogen sulfide which comprises forming in an inert organic solvent a mixture of about 1 mole of an alcohol having the formula $$ROH$$

where R is an alkyl group containing 2 to 8 carbon atoms and about 1 mole of an anhydrous hydroxide having the formula $$MOH$$

where M is an alkali metal, adding to said mixture with intimate mixing in the range of about 1 to 1.2 moles of carbon disulfide over a period of time in the range of about 0.1 to 2 hours while maintaining the resultant reaction mixture at a temperature in the range of about 20° to 50° C. to form therein a compound having the formula

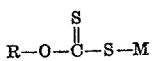

adding to said reaction mixture with intimate mixing in the range of about 0.5 to 0.6 mole of a sulfur halide having the formula $$S_yX_2$$

where y is an integer of 1 to 2 and X is a halogen atom, said sulfur halide being added over a period in the range of about 0.5 to 2 hours while maintaining the resultant second reaction mixture at a temperature in the range of about 40° to 70° C. to form therein an alkyl xanthogen sulfide, and separating said alkyl xanthogen sulfide from said second reaction mixture.

9. An improved method for preparing isopropyl xanthogen tetrasulfide which comprises forming a mixture of about 1 mole of isopropyl alcohol and about 1 mole of NaOH in benzol, adding to said mixture with intimate mixing in the range of about 1 to 1.2 moles of carbon disulfide while maintaining said mixture at a temperature of about 20–50° C. to form sodium isopropyl xanthate in the resultant reaction mixture, adding to said reaction mixture with intimate mixing in the range of about 0.5 to 0.6 mole of sulfur monochloride while maintaining said reaction mixture at a temperature of about 40–70° C. to form isopropyl xanthogen tetrasulfide in the resultant second reaction mixture, and recovering said isopropyl xanthogen tetrasulfide from said second reaction mixture.

10. An improved method for preparing alkyl xanthogen tetrasulfides which comprises introducing into a reaction zone an inert organic solvent, about 1 mole of an alcohol having the formula $$ROH$$

where R is an alkyl group containing 2 to 8 carbon atoms, and about 1 mole of an anhydrous alkali metal hydroxide, intimately mixing said materials in said reaction zone and introducing into said reaction zone about 1 to 1.2 moles of carbon disulfide while maintaining the temperature of the reaction zone at about 20–50° C. to form therein a compound having the formula

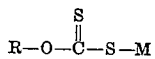

wherein M is an alkali metal, introducing to said reaction zone maintained at a temperature of about 40–70° C. about 0.5 to 0.6 mole of sulfur monochloride and intimately mixing the contents of said reaction zone to form an alkyl xanthogen tetrasulfide in the resultant reaction mixture, withdrawing said reaction mixture from said reaction zone and passing said reaction mixture to a settling zone wherein metal chloride formed in said reaction zone is settled out from the liquid portion of said reaction mixture, decanting said liquid portion from said metal chloride and passing said liquid portion to a distillation zone wherein said alkyl xanthogen tetrasulfide is separated from the remainder of said liquid portion of said reaction mixture.

References Cited in the file of this patent

UNITED STATES PATENTS

| | | |
|---|---|---|
| 1,491,021 | Adams | Apr. 22, 1924 |
| 2,250,545 | Mikeska et al. | July 29, 1941 |
| 2,431,010 | Zimmer | Nov. 18, 1947 |
| 2,678,939 | McCool | May 18, 1954 |